Dec. 22, 1964 E. F. CLUNE 3,162,811
MAGNETRON TRANSMITTER ERROR DETECTION AND CORRECTION SYSTEM
Filed Oct. 17, 1962
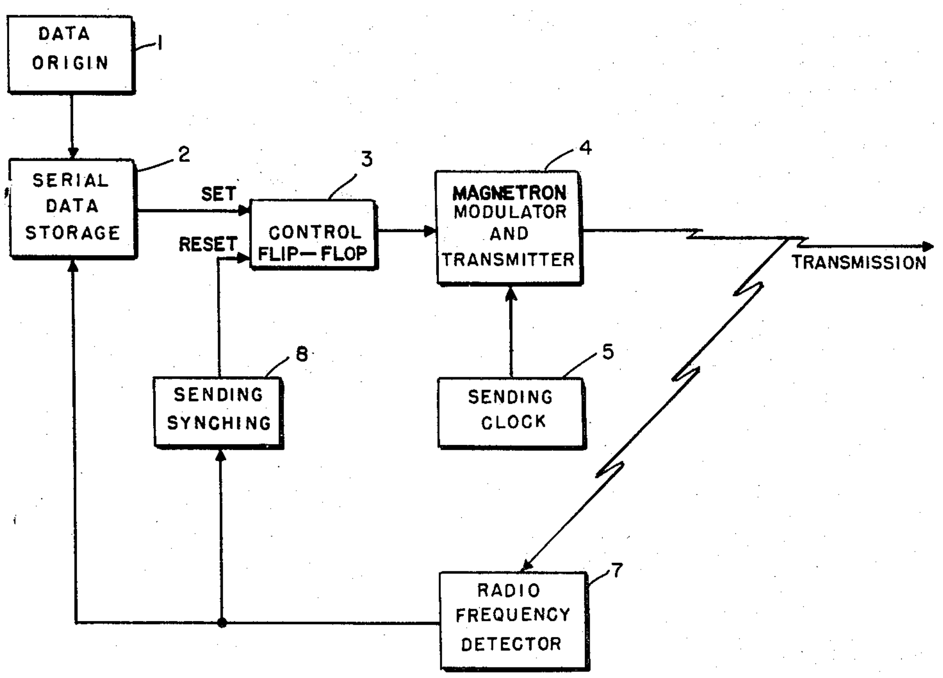
INVENTOR,
ELMER F. CLUNE
BY Harry M. Saragovitz
ATTORNEY.

3,162,811

MAGNETRON TRANSMITTER ERROR DETECTION AND CORRECTION SYSTEM

Elmer F. Clune, Tonawanda, N.Y., assignor to the United States of America as represented by the Secretary of the Army Filed Oct. 17, 1962, Ser. No. 231,308
4 Claims. (Cl. 325—121)

This invention relates to serial data transmission systems having means for automatically repeating the transmission of bits which have not been properly transmitted. More particularly, it deals with non-synchronized serial data links using pulsed magnetrons in which magnetron misfire is detected and taken into account in the serial advance of read-in of data to the data link modulator.

A number of error detection and automatic repetition systems have been previously developed. These systems rely on means positioned at the receiving equipment for detecting an error which may have occurred either at the transmitter or in the transmission system. Indication of an error in the received message must be made available at the transmitter so that part or all of the message may be retransmitted. Such data transmission systems utilize various conditions sometimes referred to as "1" and "0" in codes of a given length (such as a five-unit code). At the receiver the code is analyzed to determine if it has a predetermined ratio of "1" to "0" units. Costly equipment is required to inform the transmitter when an error has been received. Furthermore, this method is time consuming since the transmitter does not receive a request for the repetition of a character until a few of the following characters have been sent due to time delays in the equipment. This necessitates the storage of signals so that they can be repeated in case of an error. After the repetition of an erroneous character and those characters which had occurred up to the time the transmitter was notified of the error, the transmission is resumed at the point where it was interrupted.

It is an object of this invention to provide means for advancing data at the sending end of a data link only when a full power pulse or coded train of full power pulses is emitted by the magnetron at the transmitter.

Another object of this invention is to provide a reliable data link employing a pulsed magnetron at the transmitter.

Another object of this invention is to provide means for detecting errors in data link messages which is simple and inexpensive.

Generally speaking, this invention relates to non-synchronized serial data links using pulsed magnetrons. Allowable magnetron misfire at end-of-life ranges is as high as five percent. Probability of correct transmission of a data block of one hundred bits, for example, is therefore exceedingly low unless magnetron misfire is detected and taken into account. In non-synchronized data links the information bits are transmitted serially, and each time a bit is transmitted a new bit is advanced to the next-to-be-transmitted position. If the magnetron misfires, the data will not be received on the reception end of the data link, and no advance of serial data should be effected. Thus, to eliminate the effect of magnetron misfire the data is advanced at the sending end by detecting when a full power pulse or coded train of pulses is emitted by the magnetron. If the magnetron misfires, no advance of data occurs at the receiving end, and the same bit is again in position to be transmitted at the sending end.

Broadly, the object of this invention is accomplished by storing the data which is to be transmitted in a serial storage device such as a shift register. The output from the data storage is connected to a control means which, in turn, is connected to the data link modulator and transmitter. A radio frequency detector, which is adapted to detect the transmission of a signal, produces a pulse which advances the data in the serial data storage and also resets the control means in preparation for its receiving the next bit from the storage device. If the magnetron in the transmitter misfires, the data is not advanced in the storage device and the control means remains in the same condition so that the same bit is available to be transmitted.

The above mentioned and other features and objects of this invention will become more apparent from the following description taken in conjunction with the accompanying drawing in which the figure illustrates in block form a circuit for advancing data in a non-synchronized serial data link only when the previous bit has been transmitted.

Referring to the figure, data origin 1, which may be a parallel storage of data, feeds into the serial data storage 2, which may be a magnetic core or transistor shift register. Inherent in the operation of this type of shift register is the fact that an assertion (actual signal) between register elements is present only when a "1" bit is shifted. A zero bit is simply the absence of a bit as the register is shifted. The control flip-flop 3 and the sending syncing circuit 8 are used to obtain a static indicaiton of the output bit value as the register is shifted. As it is desired to read out the stored information to the data link modulator, control flip-flop 3 is first reset to the "0" state by a trigger pulse from sending syncing circuit 8. Then the output from the serial data storage 2 either sets this flip-flop to the "1" state or does not set it to the "1" state depending upon the presence or absence of a "1" pulse from the output of the serial data storage. The storage flip-flop is then read for content by the magnetron modulator 4 under clock control, and the appropriate bit value is transmitted. The modulator and the transmitter 4 comprises a magnetron which is triggered by each pulse from sending clock 5. The magnetron is pulse code modulated by the output of control flip-flop 3. The zig-zag line coming from the transmitter represents any form of transmission to the data link receiver (not shown). As represented by the second zig-zag line, some of the transmitted energy is diverted to the radio frequency detector 7 by some conventional pick up device such as a directional coupler or RF probe depending on the particular type of RF transmission used on the data link. Radio frequency detector 7 detects the output from the transmitter, and if a full power pulse has been emitted produces a pulse which resets the control flip-flop 3 by way of sending syncing circuit 8; this pulse also advances the data in serial data storage 2. If the magnetron misfires for any of the pulses in the pulse train there is no advance of data at the transmitter since there is no output from detector 7. Therefore, the bit stored at control flip-flop 3 remains to modulate the transmitter output at the next pulse from clock 5.

There has thus been described simple and inexpensive yet reliable means for detecting magnetron misfire and repeating the signals which should have been transmitted during such misfire.

What is claimed is:

1. In a non-synchronized serial data link employing a pulsed magnetron, a transmitter system comprising: a transmitter; serial data storage means; detector means to detect the output of said transmitter; and means connecting said storage means to said transmitter for advancing data from said storage means upon detection by said detector means of a full power pulse emitted by said transmitter so that the effect of magnetron misfire is eliminated.

2. In a non-synchronized serial data transmitter system the combination comprising: a modulator and transmitter of serial data; serial data storage means; control means connected to said storage means for obtaining a static indication of the output bit value which has been last shifted from said storage means, the output of said control means being connected to said modulator and transmitter; detector means to detect the output of said transmitter; and means for generating a control signal for shifting the data in said data storage means and resetting said control means upon detection by said detector means, of an output pulse from said transmitter.

3. A non-synchronized serial data link transmitter comprising: modulator and transmitter means for transmitting radio frequency pulses; serial data storage means; control means connected between said storage means and said transmitter means for obtaining a static indication of the output bit value which has been last shifted from said storage means; sending syncing means connected to said control means for generating a trigger pulse upon application of an input pulse thereto; and radio frequency detector means connected to said data storage means and said syncing means for applying pulses thereto upon detection of radio frequency pulses from said transmitter means.

4. The non-synchronized serial data link transmitter of claim 3 further comprising a sending clock connected to said modulator and transmitter means.

References Cited by the Examiner

UNITED STATES PATENTS

| | | | |
|---|---|---|---|
| 2,281,745 | 5/42 | Buckingham | 325—41 |
| 2,790,142 | 4/57 | Guthrie | 328—120 |
| 2,946,020 | 7/60 | Hudson | 328—120 |
| 2,978,541 | 4/61 | Steeneck et al. | 178—23.1 |
| 3,078,443 | 2/63 | Rose | 325—41 |

DAVID G. REDINBAUGH, *Primary Examiner.*